(12) United States Patent
Thyagarajan

(10) Patent No.: US 8,223,628 B2
(45) Date of Patent: Jul. 17, 2012

(54) DATA TRANSMISSION METHOD, TRANSMITTER, RECEIVER, TRANSCEIVER AND TRANSMISSION SYSTEM

(75) Inventor: Umashankar Thyagarajan, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 549 days.

(21) Appl. No.: 11/651,923

(22) Filed: Jan. 10, 2007

(65) Prior Publication Data

US 2008/0165804 A1 Jul. 10, 2008

(51) Int. Cl.
*G01R 31/08* (2006.01)
*H04L 12/28* (2006.01)
*G08C 25/02* (2006.01)

(52) U.S. Cl. ......... 370/216; 370/394; 714/746; 714/748
(58) Field of Classification Search ................ None
See application file for complete search history.

(56) References Cited

U.S. PATENT DOCUMENTS

| | | | | |
|---|---|---|---|---|
| 6,473,399 B1* | 10/2002 | Johansson et al. | ............ | 370/229 |
| 6,694,471 B1 | 2/2004 | Sharp | | |
| 6,810,488 B2 | 10/2004 | Teng | | |
| 6,816,478 B1* | 11/2004 | Laroia et al. | ................ | 370/349 |
| 7,020,826 B2 | 3/2006 | Litwin, Jr. et al. | | |
| 7,106,742 B1* | 9/2006 | Frisch et al. | ................ | 370/394 |
| 7,236,787 B1 | 6/2007 | Tamura et al. | | |
| 7,305,486 B2* | 12/2007 | Ghose et al. | ................ | 709/232 |
| 2002/0131455 A1* | 9/2002 | Cioffi et al. | ................ | 370/503 |
| 2002/0159520 A1 | 10/2002 | Choi et al. | | |
| 2003/0026247 A1 | 2/2003 | Bernstein | | |
| 2003/0098804 A1* | 5/2003 | Ekstrand et al. | ............... | 341/107 |
| 2003/0115331 A1 | 6/2003 | Xie et al. | | |
| 2004/0009786 A1 | 1/2004 | Terry | | |
| 2004/0148396 A1 | 7/2004 | Meyer et al. | | |
| 2004/0156366 A1 | 8/2004 | Walls et al. | | |
| 2005/0036452 A1* | 2/2005 | Banerjee et al. | ............... | 370/252 |
| 2005/0054319 A1* | 3/2005 | Tamaki et al. | ................ | 455/296 |
| 2005/0169199 A1 | 8/2005 | Futenma et al. | | |
| 2005/0201339 A1* | 9/2005 | Mangin et al. | ................ | 370/337 |
| 2005/0226239 A1* | 10/2005 | Nishida et al. | ................ | 370/389 |
| 2005/0276249 A1* | 12/2005 | Damnjanovic et al. | ........ | 370/335 |
| 2006/0062173 A1 | 3/2006 | Cheng et al. | | |
| 2006/0083323 A1* | 4/2006 | DesJardins et al. | ........... | 375/260 |
| 2006/0133290 A1 | 6/2006 | Lindoff et al. | | |
| 2006/0178167 A1 | 8/2006 | Tamura et al. | | |

(Continued)

FOREIGN PATENT DOCUMENTS

EP 0978958 A1 2/2000

(Continued)

OTHER PUBLICATIONS

Office Action dated Sep. 17, 2009 in connection with U.S. Appl. No. 11/696,515.

(Continued)

*Primary Examiner* — Michael J Moore, Jr.
*Assistant Examiner* — Hicham Foud
(74) *Attorney, Agent, or Firm* — Eschweiler & Associates, LLC

(57) ABSTRACT

A method of transmitting data includes generating interleaved data. The method also includes converting the interleaved data into a modulated signal, and transmitting the modulated signal. The interleaved data is also stored, for example, in a buffer. The method further includes determining whether a retransmission of the modulated signal is required, and retransmitting the interleaved data based on a result of that determination.

26 Claims, 11 Drawing Sheets

U.S. PATENT DOCUMENTS

| | | |
|---|---|---|
| 2007/0141991 A1* | 6/2007 | Hong et al. ............. 455/63.1 |
| 2007/0147335 A1 | 6/2007 | Ido et al. |
| 2007/0260965 A1* | 11/2007 | Schmidt et al. ............. 714/799 |
| 2008/0062872 A1 | 3/2008 | Christiaens et al. |
| 2009/0013088 A1 | 1/2009 | Harada |
| 2009/0154702 A1 | 6/2009 | Tamura et al. |
| 2010/0046370 A1 | 2/2010 | Ghose et al. |

FOREIGN PATENT DOCUMENTS

| | | |
|---|---|---|
| JP | 2005145594 | 6/1993 |
| JP | 2005086594 | 3/2005 |
| JP | 2006245912 | 9/2006 |
| WO | 8605339 | 9/1986 |
| WO | 9848528 A1 | 10/1998 |
| WO | 2006104104 | 10/2006 |

OTHER PUBLICATIONS

Office Action dated Apr. 5, 2010 in connection with U.S. Appl. No. 11/696,515.

* cited by examiner

DATA TRANSMISSION METHOD, TRANSMITTER, RECEIVER, TRANSCEIVER AND TRANSMISSION SYSTEM

BACKGROUND OF THE INVENTION

The present invention relates to a method of transmitting data, a transmitter, a receiver and a transceiver.

One field of data transmission, such as wireless data transmission or data transmission, is based on digital subscriber line (DSL) methods. In such data transmission systems, the data transmission channels are usually subject to fluctuating environmental conditions or noise, thus making signals transmitted prone to being corrupted. For DSL, various methods of error protection have been developed and are presently employed. One conventional method of implementing error protection in DSL uses, e.g., Reed-Solomon encoding. The level of protection that is implemented is usually determined during start up of, e.g., a DSL modem and is employed throughout the operation time of the modem.

SUMMARY

A first embodiment of the invention is a method of transmitting data that includes generating interleaved data. The method also includes converting the interleaved data into a modulated signal, and transmitting the modulated signal. The interleaved data is also stored, for example, in a buffer. The method further includes determining whether a retransmission of the modulated signal is required, and retransmitting the interleaved data based on a result of that determination.

Other embodiments include related receivers, transmitters, transceivers, and transmission systems.

An exemplary embodiment of a transceiver includes an interface unit, a monitoring unit and a retransmission controller. The interface unit is operable to transmit a first signal comprising first data and to receive a second signal. The monitoring unit is coupled to the interface unit to determine an indicator of corruption of the second signal. The retransmission controller coupled to said monitoring unit to receive said indicator and coupled to said interface unit to initiate retransmission of said first data based on said indicator.

BRIEF DESCRIPTION OF THE SEVERAL VIEWS OF THE DRAWINGS

Hereinafter, exemplary embodiments of the invention will be described with reference to the drawings.

DETAILED DESCRIPTION OF THE INVENTION

Figure 1:
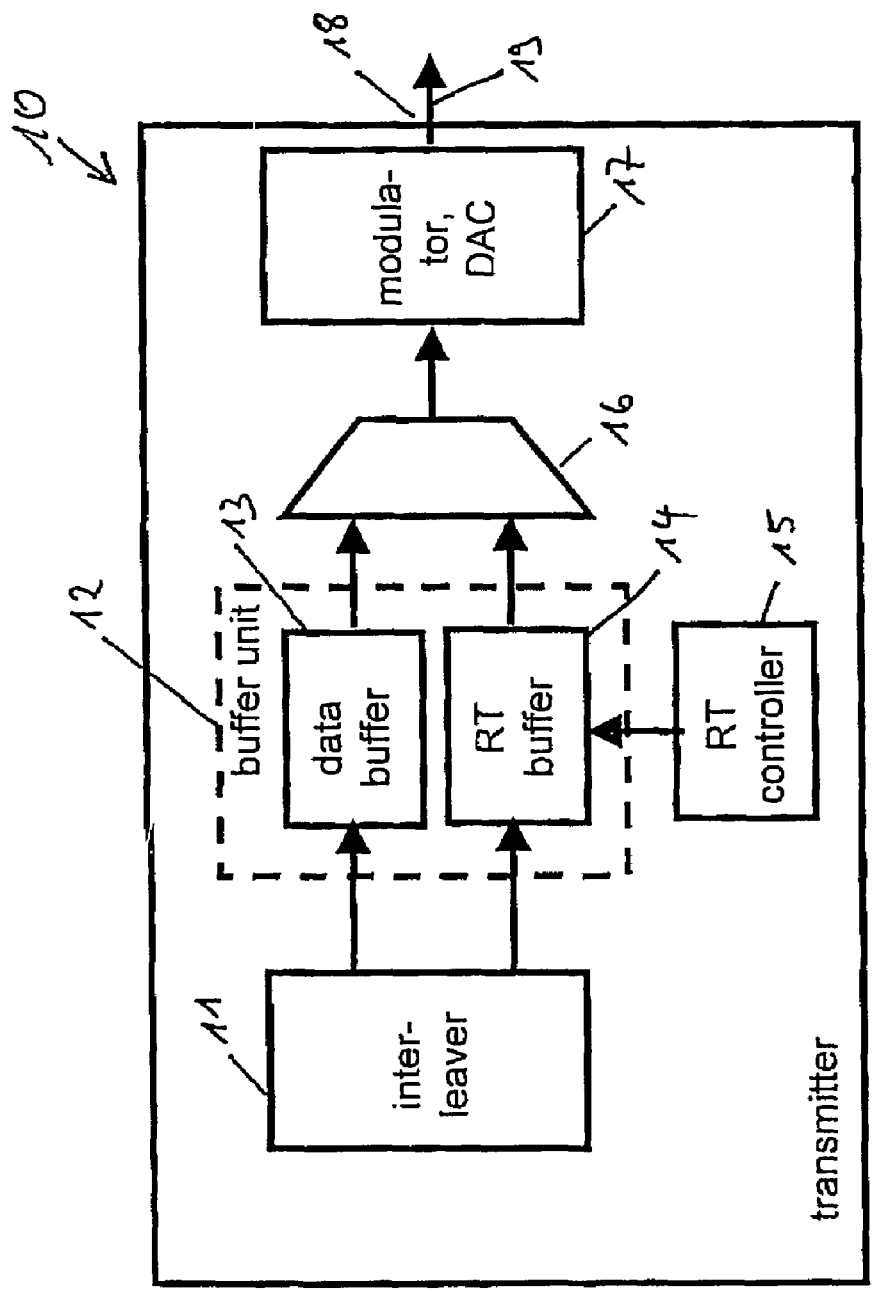
FIG. 1 is a schematic block diagram representation of a transmitter according to an embodiment of the invention.

In the following, exemplary embodiments of the present invention will be described in detail. It is to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

It is also to be understood that, in the following description of exemplary embodiments, any direct connection or coupling between functional blocks, devices, components, or other physical or functional units shown in the drawings or described herein could also be implemented by an indirect connection or coupling. In particular, it should be appreciated that any data connection between functional devices or units, such as between a transmitter and a receiver or between two transceivers, may be implemented as a physical link, such as a wire or line, or as a wireless connection.

It is to be understood that the features of the various exemplary embodiments described herein may be combined with each other, unless specifically noted otherwise.

FIG. 1 is a schematic block diagram representation of a transmitter 10 according to an embodiment of the invention. As will be explained more fully below, the transmitter 10 of the embodiment of FIG. 1 provides error protection capabilities by combining the retransmission of signals with interleaving.

The transmitter 10 of FIG. 1 comprises an interleaver 11, a buffer unit 12, a multiplexer 16 and modulator and digital-to-analog (D/A) converter componentry 17. The transmitter 10 further comprises a retransmission controller 15. The buffer unit 12 comprises a data buffer 13 and a retransmission buffer 14, both of which are respectively coupled to the interleaver 11 and multiplexer 16. The retransmission buffer 14 is further coupled to the retransmission controller 15.

The operation of the transmitter 10 will be explained next. The interleaver 11 receives data and interleaves the data to generate interleaved data. As used herein, the term "interleaved data" refers to data which has undergone an interleaving. The interleaved data may be data that is directly output from an interleaving process, or may be data that has undergone further processing after interleaving. The interleaved data is output from interleaver 11 to both data buffer 13 and retransmission buffer 14, both of which buffer or temporarily store the interleaved data. The interleaved data is output from data buffer 13 via multiplexer 16 to the modulator and D/A-converter 17, where a modulated analog signal is generated. The modulator 17 may convert the interleaved data to a modulated signal using any one of a wide variety of modulation techniques, such as orthogonal frequency division multiplexing (OFDM) modulation, for example discrete multitone (DMT) modulation, with or without trellis coding. After D/A-conversion, the thus generated symbol 19 is transmitted via interface 18. It is to be noted that, in the exemplary embodiments described below, the symbols correspond to OFDM or DMT modulated signals in the analog regime. However, in other embodiments, symbols may represent OFDM or DMT modulated digital data which may or may not include a cyclic extension.

The retransmission controller 15 and the retransmission buffer 14 in combination have a function of allowing the interleaved data corresponding to symbol 19 to be retransmitted in case the symbol 19 has been corrupted during its first transmission, or in case the corruption has reached a degree that does not allow for a correct decoding of the symbol. Even after interleaved data is output from the data buffer 13 to the modulator 17, the interleaved data will remain stored in the retransmission buffer 14 for a predetermined short time period. In one exemplary embodiment, the short time period may be 4 ms. Other time periods are provided in other embodiments. When it is determined, using for example the methods and devices that will be explained more fully below or any other methods and devices, that the symbol 19 originally transmitted has been corrupted so that a reconstruction of the data is no longer possible, the retransmission controller 15 controls the retransmission buffer 14 to output the corresponding buffered interleaved data via multiplexer 16 to modulator 17. The modulator 17 again converts the interleaved data to a modulated signal or symbol 19 that is identical to the symbol 19 that has previously been transmitted, and retransmits the symbol via interface 18. While in the exemplary embodiment of FIG. 1 the symbol 19 that is retransmitted is identical to the symbol 19 that has been originally transmitted, in another embodiment, a symbol may be generated for retransmission that, while comprising the interleaved data that are to be retransmitted, may be different from the symbol 19 that has been originally transmitted. In one exemplary embodiment, modulator componentry coupled to the retransmission buffer 14 may be different from modulator componentry coupled to the data buffer 13.

It is to be noted that, according to the transmitter 10 of the embodiment of FIG. 1, the retransmission buffer 14 stores data that is interleaved and essentially corresponds to a frequency-domain representation of the symbol 19 that is transmitted via interface 18. Since the interleaved data buffered by the retransmission buffer 14 has essentially the same information content (with the possible exception of overhead added during trellis coding) as the symbol 19 transmitted via interface 18, but is still in the frequency domain, the interleaved data will also be referred to as "frequency domain symbol" hereinafter.

As will be appreciated, according to the transmitter 10 of the embodiment of FIG. 1, the retransmission is handled at the first layer of the open systems interconnection (OSI) layer model since in case a retransmission is required the frequency-domain symbol may be directly retrieved from the retransmission buffer 14 and may be remodulated to retransmit the symbol. In an embodiment, only the interleaved data that corresponds to the corrupted symbol is retrieved from the retransmission buffer 14 to be modulated again, and the symbol 19 is retransmitted via interface 18.

In the transmitter 10 of the embodiment of FIG. 1, by combining retransmission at the first layer of the OSI layer model and interleaving, error protection capability is provided while simultaneously requiring only moderate overhead and having little impact on latency.

As will be appreciated, many modifications and variations of the transmitter 10 of the embodiment of FIG. 1 are conceivable. For example, the data buffer 13 and retransmission buffer 14 may be configured as a single buffer unit having a data buffer portion and a retransmission buffer portion. According to another embodiment, a single buffer provides both data buffer and retransmission buffer functionalities. In another embodiment, interleaved data stored in the buffer unit 12 has an identifier associated with it indicative of which symbol the interleaved data corresponds to, and the retransmission controller 15 controls which of the interleaved data is output from the retransmission buffer 14 based on the identifier. In yet another embodiment, the data buffer 13 may be omitted, i.e., interleaved data is provided directly from the interleaver 11 to the multiplexer 16 and to the retransmission buffer 14, respectively. Further, the retransmission controller 15 does not have to be directly coupled to the retransmission buffer 14, but may be coupled to the retransmission buffer 14 via the multiplexer 16, so that the retransmission controller 15 selects the active multiplexer input in dependence on whether a symbol has to be retransmitted or not.

The transmitter 10 of the embodiment of FIG. 1 may comprise additional componentry, as appropriate for the transmission medium and transmission method contemplated. Such variants of the embodiment of FIG. 1 will be explained next with reference to FIGS. 2 and 3.

Figure 2:
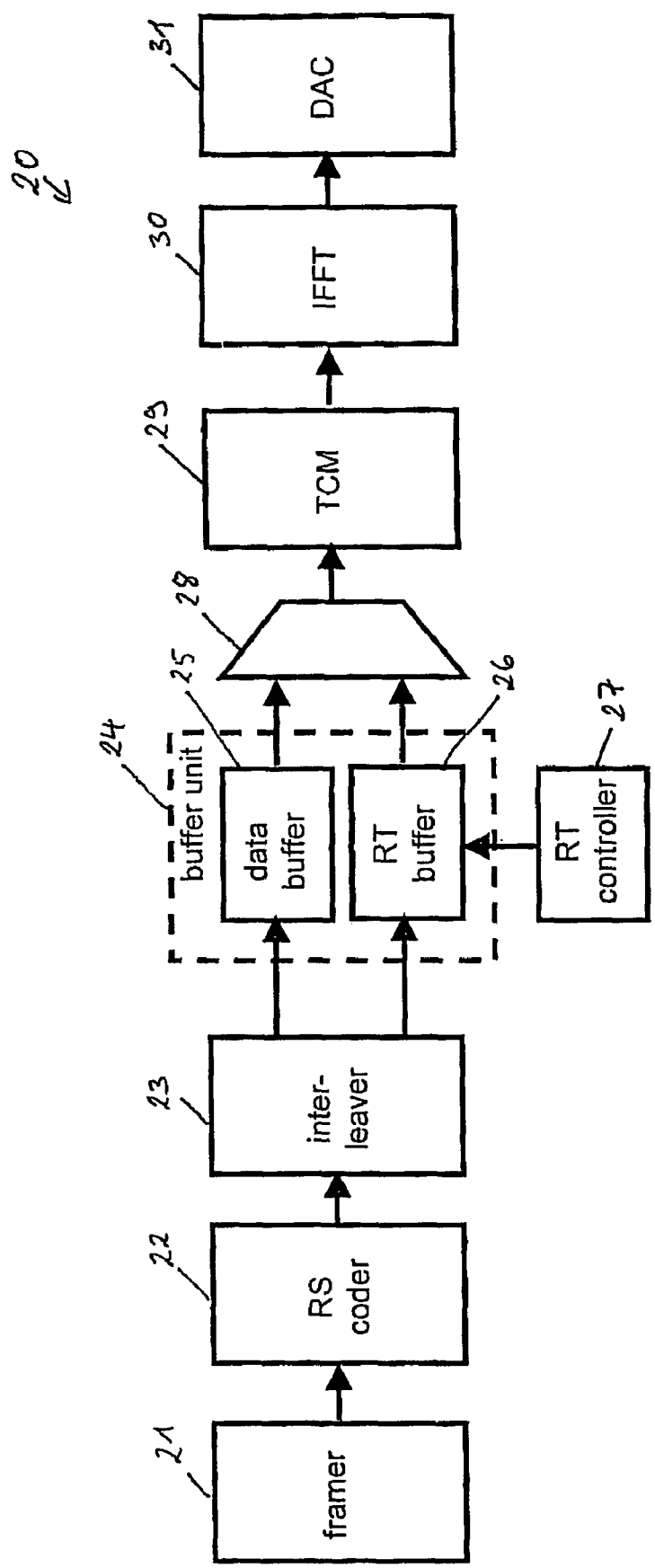
FIG. 2 is a schematic block diagram representation of a transmitter according to another embodiment of the invention.

FIG. 2 is a schematic block diagram representation of a transmitter 20 according to another embodiment of the invention. The transmitter 20 of FIG. 2 comprises an interleaver 23, a buffer unit 24 including a data buffer 25 and a retransmission buffer 26, a retransmission controller 27 and a multiplexer 28, the configuration, operation and coupling of which is identical to the one of the corresponding components explained with reference to FIG. 1 above. In addition, the transmitter 20 comprises a framer 21 that provides data frames to a Reed-Solomon (RS) coder 22 that generates a RS codeword, that is in turn provided to the interleaver 23. Further, the modulator componentry of the transmitter 20 comprises a trellis code modulator 29 and a unit 30 that performs, e.g., an inverse Fourier transform to generate the modulated signal, based on, e.g., OFDM or DMT modulation. D/A-converter 31 receives the modulated digital signal to generate an analog signal that is output from the transmitter 20.

Figure 3:
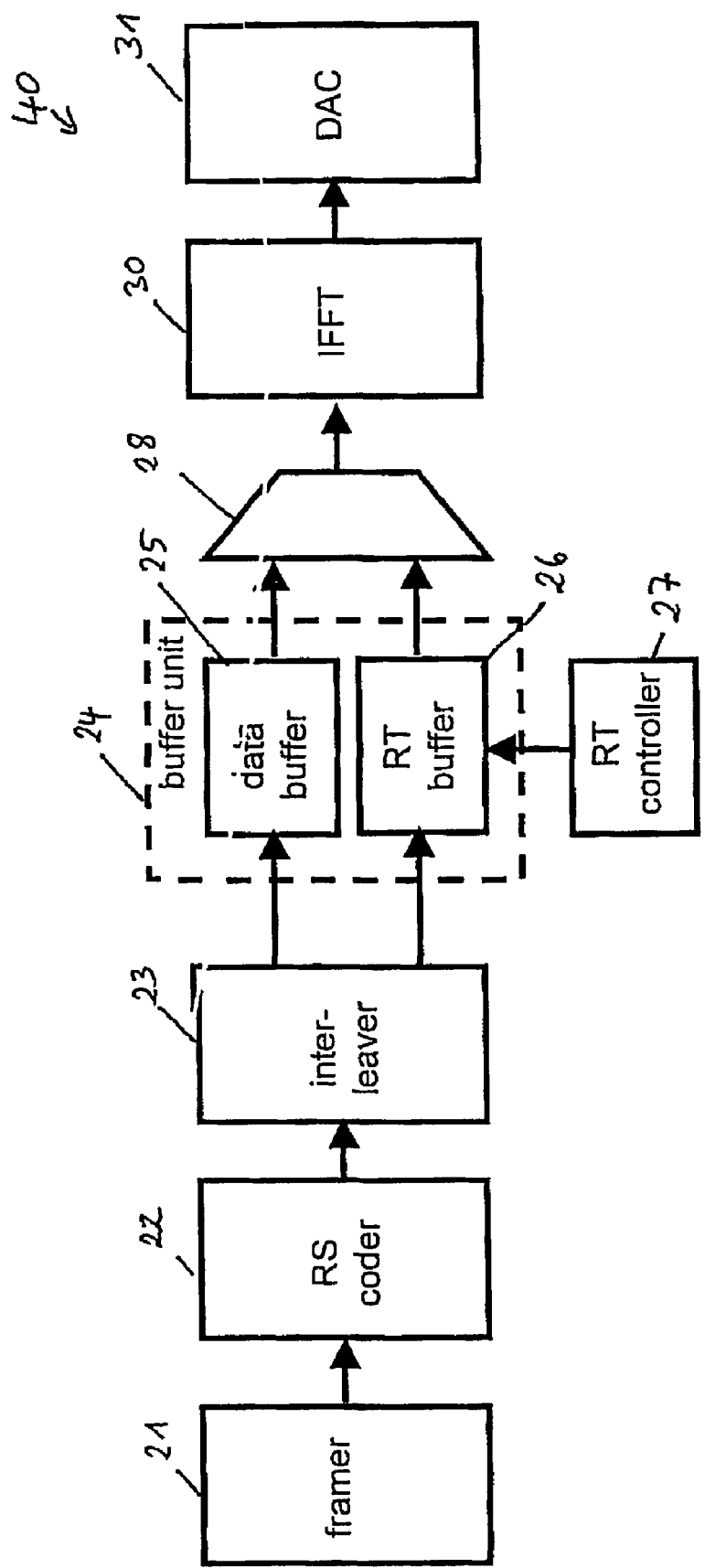
FIG. 3 is a schematic block diagram representation of a transmitter according to another embodiment of the invention.

FIG. 3 is a schematic block diagram representation of a transmitter 40 according to yet another exemplary embodiment which is in principle similar to the transmitter 20 of the embodiment of FIG. 2, but does not include a trellis code modulator. Rather, in the transmitter 40 of the embodiment of FIG. 3, data is directly output from multiplexer 28 to the unit 30 that performs an inverse Fourier transform.

The determination whether a symbol is corrupted to such a degree that it has to be retransmitted may be made in various ways. Exemplary embodiments will be explained next.

Figure 4:
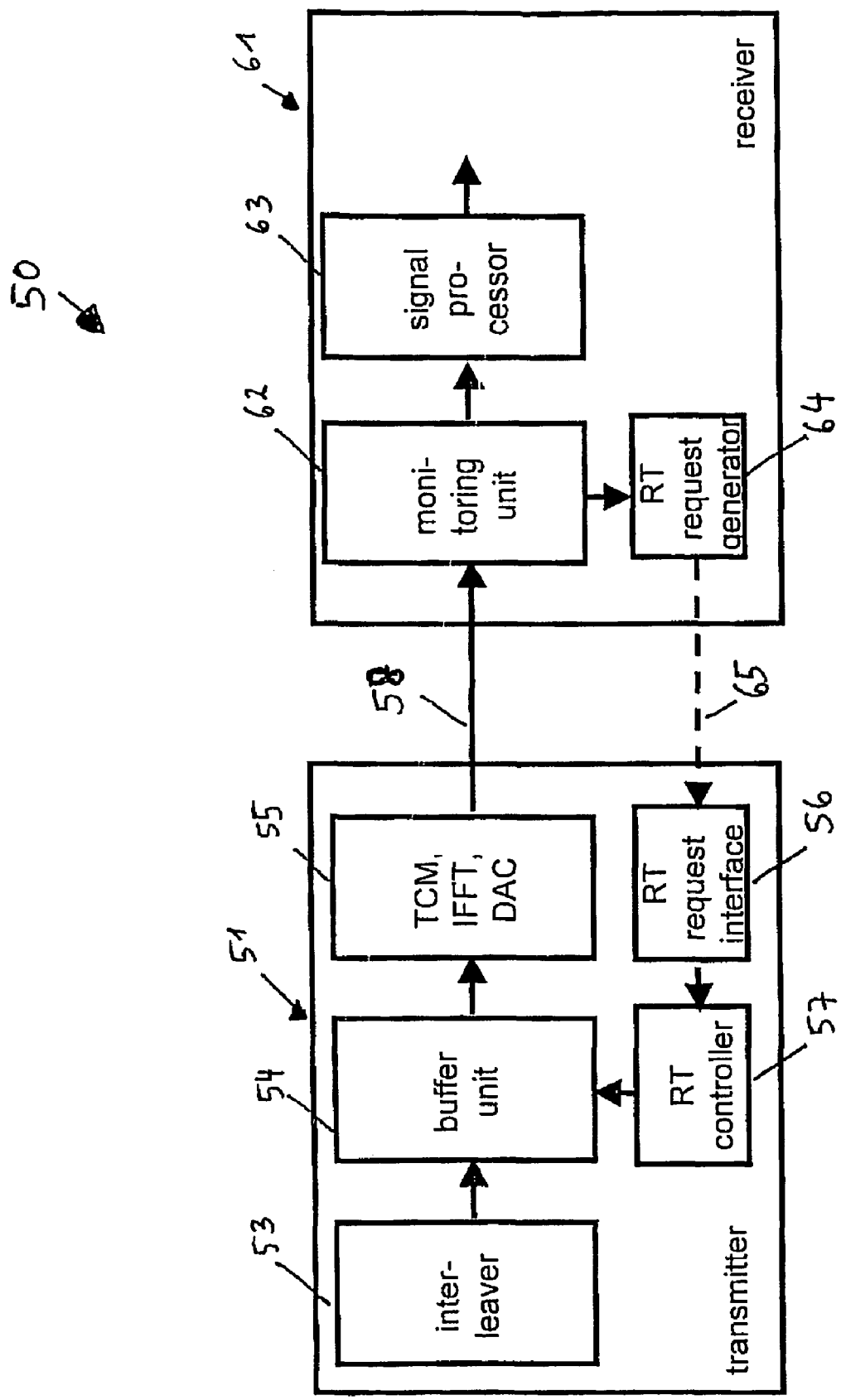
FIG. 4 is a schematic block diagram representation of a transmission system according to an embodiment of the invention.

FIG. 4 is a schematic block diagram representation of a transmission system 50 according to an embodiment of the invention that comprises a transmitter 51 and a receiver 61. In the transmission system 50, the determination whether a symbol has to be retransmitted is made by the receiver 61 which generates a corresponding retransmission request that is then transmitted to the transmitter 51 to initiate the retransmission.

The transmitter 51 comprises an interleaver 53, a buffer unit 54, and modulator and D/A-converter componentry 55 as well as a retransmission controller 57, the operation configuration and coupling of which are identical to the one of the corresponding components explained with reference to the embodiments of FIGS. 1-3 above. The transmitter 51 further comprises a retransmission request interface 56 that is coupled to the retransmission controller 57 to provide a retransmission request received from the receiver 61 to the retransmission controller 57.

The receiver unit 61 comprises a monitoring unit 62 that monitors corruption of a symbol 58 transmitted from the transmitter 51 to the receiver 61. The receiver 61 further comprises a signal processor 63 that performs various signal processing functions for the transmitted symbol, such as de-interleaving or decoding, and a retransmission request generator 64 coupled to the monitoring unit 62. In dependence on a degree of corruption of the symbol 58 determined by the monitoring unit 62, the monitoring unit 62 provides a signal to the retransmission request generator 64 which, responsive to the signal, generates a retransmission request 65 (indicated by a broken line) that is transmitted to the transmitter 51.

The monitoring unit 62 may have any suitable configuration for determining whether the symbol 58 has been corrupted or, more particularly, whether the corruption exceeds a predetermined threshold. In an embodiment the monitoring unit 62 determines whether the transmitted symbol 58 has been corrupted such that it can no longer be decoded correctly. Various implementations of the monitoring unit 62 may be provided in various embodiments. In an exemplary embodiment, the monitoring unit 62 may comprise a trellis decoder. In trellis decoding, the number of bits or bytes that have been incorrectly transmitted or that have been lost during transmission may be determined. Therefore, based on the number of corrupted or lost bits, the trellis decoder may control the retransmission request generator 64 so that a retransmission request is output in case the number of corrupted or lost bits exceeds the number of bits that can be corrected, for example by decoding the RS codeword. In another embodiment, the monitoring unit 62 monitors a signal-to-noise ratio of the symbol 58 transmitted from the transmitter 51 to the receiver 61. In yet another embodiment, the monitoring unit 62 monitors the analog-to-digital (A/D) conversion saturation to determine whether the symbol 58 has been corrupted beyond repair.

The operation of the transmission system 50 of FIG. 4 will be explained next. Interleaved data generated by the interleaver 53 is buffered in the buffer unit 54, from where it is output to the modulator and D/A-converter 55 that generates a modulated signal or OFDM symbol 58 for transmission to the receiver 61. At the receiver 61, the monitoring unit 62 determines an indicator of corruption of the transmitted symbol 58. If the monitoring unit 62 determines that the symbol 58 has not been corrupted or that the degree of corruption is sufficiently low that all data can be reliably retrieved, the monitoring unit 62 provides the signal to signal processor 63 which performs further signal processing, such as de-interleaving the symbol, RS decoding or similar. In contrast, if the monitoring unit 62 determines that the symbol 58 has been corrupted beyond repair, or that the probability that the symbol has been corrupted so that not all data can be safely retrieved exceeds a threshold, the retransmission request generator 64 outputs the retransmission request 65 to the transmitter 51. The transmitter 51 receives the retransmission request 65 at the retransmission request interface 56 and provides the request to the retransmission controller 57. The retransmission controller 57 in turn controls the buffer unit 54 to output the interleaved data which corresponds to the corrupted symbol 58 to the modulator and D/A-converter 55 again, so that the symbol is retransmitted. Again, the interleaved data which corresponds to the frequency-domain representation of the symbol 58 is retained in the buffer unit 54 and can be retrieved.

Next, with reference to FIG. 5, a method 70 of transmitting data according to an embodiment will be explained. The method may be performed by the transmission system 50 of FIG. 4. At step 71, a symbol is transmitted from a transmitter to a receiver, and a frequency-domain representation of the symbol is buffered by the transmitter. In an embodiment, the symbol is a symbol employed in DSL data transmission. In another embodiment, the symbol is an OFDM symbol, such as a DMT symbol. In another embodiment, the symbol is a symbol employed in wireless data transmission. At step 72, a measure of corruption of the symbol is determined. In an embodiment, the measure of corruption corresponds to a number of bits or bytes of the frequency-domain representation of the symbol that has not been correctly transmitted. In another embodiment, the measure of corruption of the symbol is a lower bound on the number of incorrectly transmitted bits or bytes. The measure of corruption may, for example, be determined by trellis decoding. At step 73, the measure of corruption is then compared to a predetermined threshold. In an embodiment, the threshold is given by the number of incorrect or missing bits or bytes that may still be corrected using, e.g., RS-decoding. If it is determined that the measure of corruption is less than the threshold, the symbol is decoded at step 76. Otherwise, a retransmission request is generated at step 74 at the receiver and is transmitted to the transmitter. At step 75, the transmitter retransmits the symbol responsive to the retransmission request. In an embodiment, the retransmission comprises retrieving and modulating the buffered frequency-domain symbol to generate the symbol again. At step 76, the retransmitted symbol is then decoded.

Figure 5:
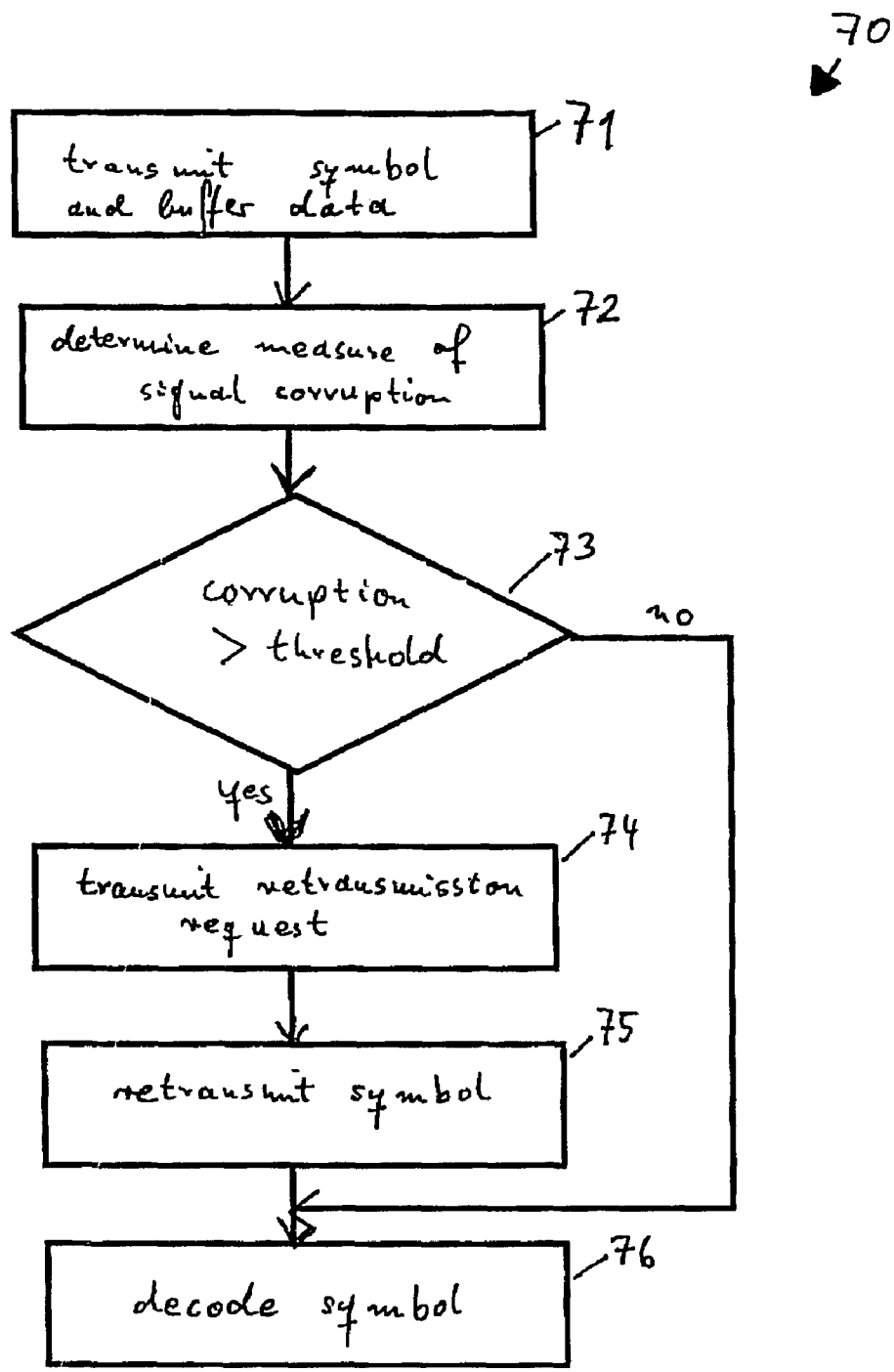
FIG. 5 is a flow diagram representation of a data transmission method according to an embodiment of the invention.

Several variants of the method of FIG. 5 may be provided in various embodiments. For example, while according to the method 70 of FIG. 5, a symbol is retransmitted only once and is decoded even if the retransmitted symbol is also found to be corrupted, in another embodiment, the method may proceed from step 75 to step 73, thus allowing for repeated retransmissions of a symbol.

In the embodiment of FIG. 5, the determining at step 72 may for example be made prior to de-interleaving or RS-decoding the symbol. I.e., the determination may be made at the first layer of the OSI layer model, thereby allowing the retransmission request to be generated without requiring processing of corrupted symbols at higher layers of the OSI layer model prior to outputting the retransmission request.

According to an embodiment, each symbol has a symbol identifier associated with it. Then, at step 74, the symbol identifier may be included in the retransmission request and the transmitter may identify the symbol to be retransmitted based on the identifier.

Figure 6:
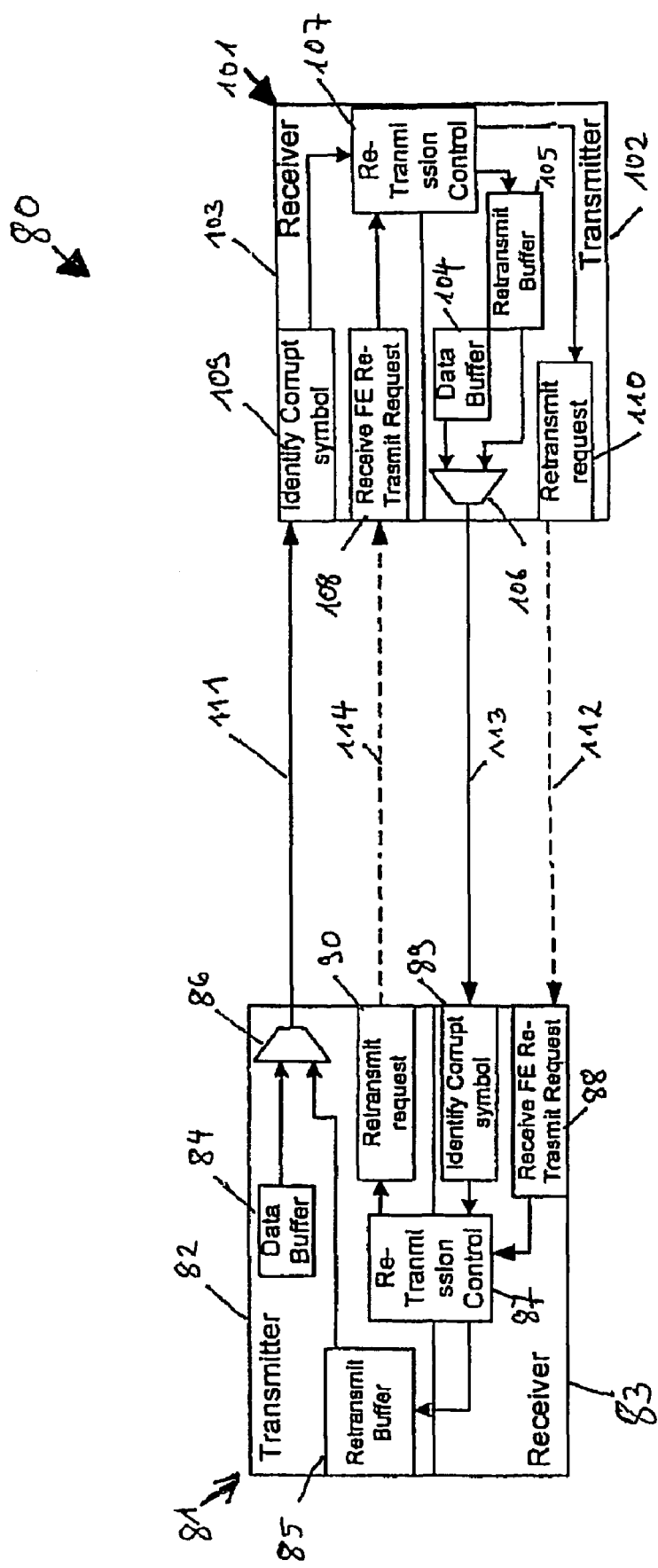
FIG. 6 is a schematic block diagram representation of a transmission system according to another embodiment of the invention.

FIG. 6 is a schematic block diagram representation of a transmission system 80 according to another embodiment of the invention, which comprises a first transceiver 81 and a second transceiver 101 coupled to each other by a bi-directional data connection. Transceiver 81 comprises a transmitter path 82 and receiver path 83. Similarly, transceiver 101 comprises a transmitter path 102 and a receiver path 103. Transceiver 81 comprises a data buffer 84, a retransmission buffer 85, and a multiplexer 86. In an embodiment, data stored in the data buffer 84 and the retransmission buffer 85 is interleaved data, i.e., a frequency-domain representation of a transmitted symbol. Via multiplexer 86, data stored in the data buffer 84 or retransmission buffer 85 is output from the first transceiver 81 as symbol 111 that is transmitted to the second transceiver 101. In the embodiment of FIG. 6, the retransmission buffer 85 again buffers the data that has been transmitted for a pre-determined time period for subsequent retransmission, if required. The transceiver 81 further comprises a retransmission controller 87 coupled to the retransmission buffer 85 to control outputting of data therefrom, a retransmission request interface 88 at which retransmission requests are received, the interface 88 being coupled to the retransmission controller 87. The transceiver 81 further comprises a monitoring unit 89 that determines whether data received at the transceiver 81 has been corrupted or whether the corruption of the symbol exceeds a threshold, and a retransmission request generator 90 which outputs a retransmission request. The monitoring unit 89 and the retransmission request generator 90 are each coupled to the retransmission controller 87.

While not shown in FIG. 6, it is to be understood that the transceiver 81 may further comprise any additional suitable transmitter or receiver componentry. In particular, the transmitter path 82 of the transceiver 81 may, e.g., comprise any functional unit or block explained with reference to FIGS. 1-4 above, such as a framer, a RS-coder, an interleaver, a trellis code modulator, an OFDM modulator, a D/A-converter or similar. Similarly, the receiver 83 may comprise any additional suitable receiver componentry.

The second transceiver 101 has a configuration that, in the exemplary embodiment of FIG. 6, is essentially identical to the one of the first transceiver 81. The second transceiver 101 comprises a data buffer 104, a retransmission buffer 105, a multiplexer 106, a retransmission controller 107, an interface 108 to receive retransmission requests, a monitoring unit 109 that monitors corruption of received symbols, and a retransmission request generator 110, the configuration, coupling and operation of which may be essentially identical to the one of the corresponding components of the first transceiver 81.

The operation of the transmission system 80 will be explained next. For data transmission from the first transceiver 81 to the second transceiver 101, interleaved data that is transmitted for the first time is output from the data buffer 84 via multiplexer 86, and is transmitted as symbol 111 to the second transceiver 101. After outputting from data buffer 85, the interleaved data remains stored in the retransmission buffer 84 for a predetermined short time. At the second transceiver 101, the unit 109 monitors a corruption of the symbol 111 and provides an indicator for the monitored corruption, e.g., the number of corrupted bits or bytes, to the retransmission controller 107. If the retransmission controller 107 determines that a retransmission of the symbol 111 is required, a retransmission request is generated by retransmission request generator 110 and is transmitted as retransmission request 112 to the first transceiver 81, where it is received at interface 88. Responsive to the retransmission request 112, the retransmission controller 87 controls the retransmission buffer 85 to output the buffered interleaved data, thereby allowing the symbol 111 to be retransmitted from the first transceiver 81 to the second transceiver 101 responsive to the retransmission request 112 generated at the second transceiver 101.

For data transmission from the second transceiver 101 to the first transceiver 81, retransmission is implemented in an analogous manner. Upon receiving a symbol 113 from the second transceiver 101, the monitoring unit 89 determines whether a retransmission is required based on a measure of corruption of the symbol 113 and initiates outputting of a retransmission request 114 to the second transceiver 101. In the second transceiver 101, retransmission of the symbol 113 is then initiated.

While in FIG. 6 the first and second transceivers 81, 101 are shown to have an essentially identical configuration, it is to be understood that the transceivers 81, 101 may also have different configurations. For example, in an embodiment the units 89, 109 that monitor corruption of received symbols may be differently configured, e.g., as a RS decoder in one transceiver and as a trellis decoder in the other transceiver, respectively. In another embodiment, data retransmission may be implemented only for data transmission from the first to the second transceiver, but not for the reverse data transmission direction.

Figure 7:
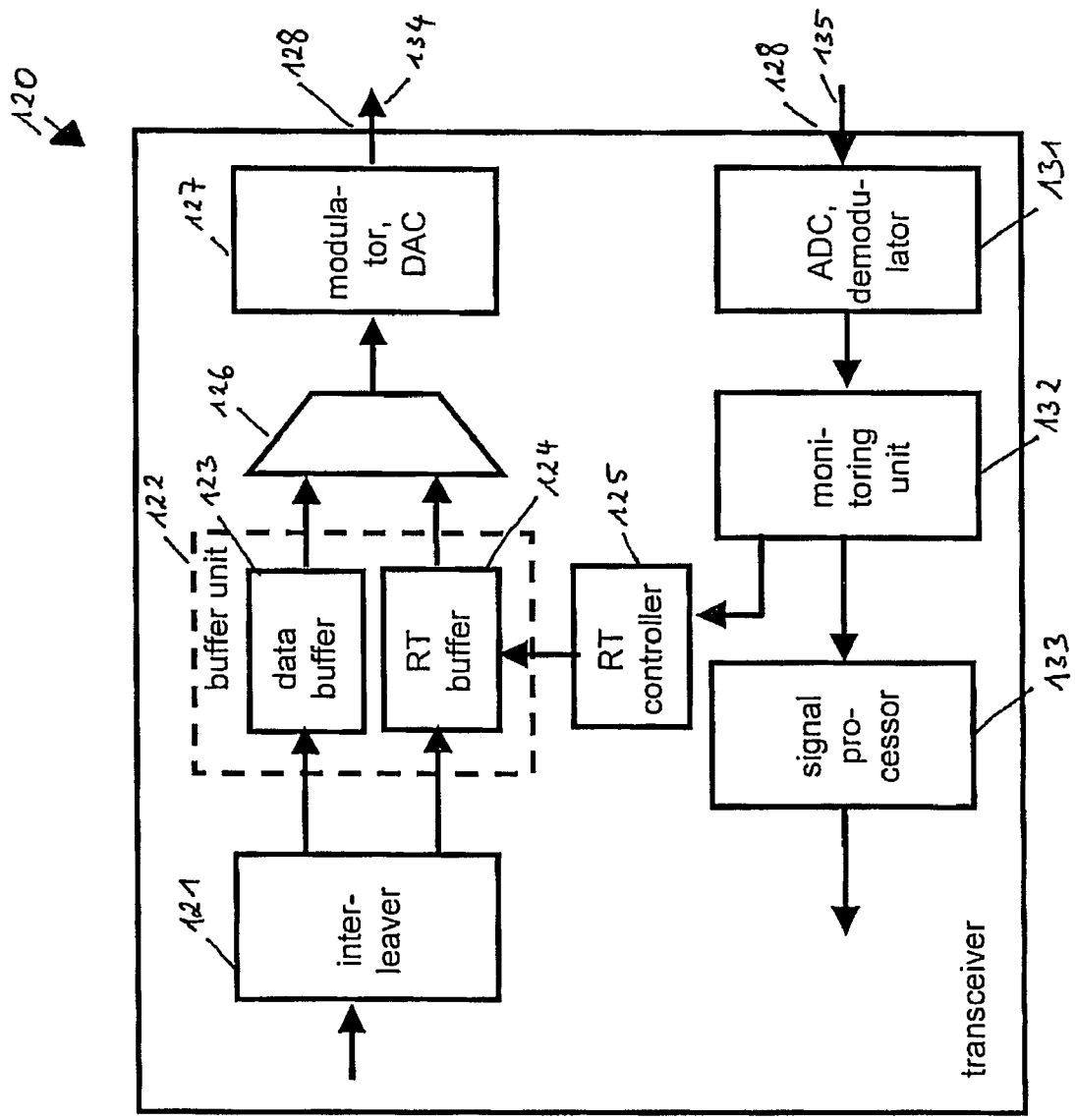
FIG. 7 is a schematic block diagram representation of a transceiver according to an embodiment of the invention.

FIG. 7 is a schematic block diagram representation of a further embodiment of the present invention. According to FIG. 7, a transceiver 120 comprises an interleaver 121, a buffer unit 122 comprising a data buffer 123 and a retransmission buffer 124, a retransmission controller 125, a multiplexer 126, a modulator and D/A-converter 127, and an interface 128 to transmit and receive symbols. The transceiver 120 further comprises an A/D-converter and demodulator 131, a monitoring unit 132 and a signal processing unit 133. The transceiver 120 transmits first symbols 134, for example OFDM or DMT symbols, to a receiver or to another transceiver and receives second symbols 135, for example OFDM or DMT symbols, via the interface 128. While the following explanations will be made with reference to OFDM or DMT symbols, it is to be understood that the operation of the transceiver 120 is not limited thereto, but that signals 134, 135 of any format may be transmitted and received.

When a symbol 134 is transmitted by the transceiver 120, the corresponding data is first interleaved by interleaver 121 and the interleaved data is then buffered in buffer unit 122, from where it is provided via multiplexer 126 to the modulator and D/A-converter 127. In an embodiment, the interleaved data stored in the buffer unit 122 corresponds to a frequency-domain representation of the symbol 134. In an embodiment, the modulator comprises a trellis code modulator. In another embodiment, the modulator 127 performs an inverse Fourier transform of the interleaved data buffered in buffer unit 122. The symbol 134 generated by the modulator and D/A-converter 127 is then output via interface 128. After outputting of the interleaved data from the buffer unit 122 to the modulator and D/A-converter 127, the interleaved data remains stored in the buffer unit 122 for a predetermined short period of time.

The symbol 134 is retransmitted by retrieving the corresponding interleaved data from the retransmission buffer 124 and providing the interleaved data to the modulator and D/A-converter 127 that generates and transmits the symbol 134 again. The retransmission of symbols 134 is initiated by the retransmission controller 125 controlling the retransmission buffer 124 to output the buffered interleaved data which corresponds to the symbol 134 that is to be retransmitted.

According to the transceiver 120 of the embodiment of FIG. 7, a determination as to whether a symbol is to be retransmitted is made autonomously by the transceiver 120, rather than by the transceiver or receiver that receives the symbol. Since in many cases a disturbance along the transmission path corrupts symbols in both transmission directions to a comparable degree, the transceiver 120 may make a decision whether a symbol that has been output for transmission has to be retransmitted by monitoring the integrity or corruption of symbols 135 received at the transceiver 120.

More particularly, in the embodiment of FIG. 7, a symbol 135 received at interface 128 is first converted to a digital signal by the A/D-converter and demodulator 131 and is then provided to monitoring unit 132. Based on the demodulated signal that may be, e.g., the frequency-domain representation of the symbol, the monitoring unit 132 determines a measure of corruption of the symbol 135 received at the transceiver 120. In an embodiment, a degree of corruption—e.g., the number of bits or bytes that has been incorrectly transmitted or lost—is determined by trellis decoding. In another embodiment, the degree of corruption is determined from a signal-to-noise ration of the received symbol. In another embodiment, the degree of corruption is determined from A/D-conversion saturation or clipping. The monitoring unit 132 provides a signal indicative of the degree of corruption of the received data to the retransmission controller 125. In an embodiment, the signal quantifies the number of corrupted bits or bytes in the data that corresponds to the received symbol 135. In another embodiment, the signal indicates whether the number of corrupted bits or bytes exceeds a threshold, which may, e.g., correspond to the number of corrupted or lost bits or bytes that may still be corrected by decoding the RS codeword. Based on the signal provided by the monitoring unit 132, the retransmission controller 125 determines whether the symbol 134 previously transmitted is to be retransmitted. In an embodiment, the retransmission controller 125 controls the buffer unit 122 to output the data corresponding to the transmitted symbol 134 when the received symbol 135 is corrupted to such a degree that it can no longer be decoded correctly. In another embodiment, an additional safety margin may be provided, i.e., the retransmission controller 125 initiates retransmission of a symbol 134 if the corruption of the received symbol 135 exceeds a threshold, but is still sufficiently low for the received symbol 134 to be decoded correctly, in order to accommodate the possibility of symbols transmitted in opposite directions being corrupted to different degrees. In yet another embodiment, the retransmission controller 125 determines a probability that the transmitted symbol 134 has been corrupted during transmission based on the measure of corruption of the received symbol 135.

The data received at interface 128 and monitored by monitoring unit 132 are then further processed by the signal processor 133 that is only schematically indicated. In an embodiment, the signal processor 133 may comprise one or several of a RS decoder, a de-interleaver, a de-framer or similar.

It will be appreciated that, for the transceiver 120 according to the exemplary embodiment of FIG. 7, it is no longer required to transmit control signals in the form of retransmission requests between transceivers to initiate retransmission of a corrupted symbol. Rather, the transceiver 120 according to the exemplary embodiment of FIG. 7 determines autonomously whether a symbol is to be retransmitted.

Usually, the transceiver 120 will successively output a plurality of first symbols 134 via interface 128. Data corresponding to a frequency-domain representation of a given number of these symbols 134 will remain buffered in the retransmission buffer 124. In an embodiment, when the monitoring unit 132 and the retransmission controller 125 determine that the received symbol 135 has been corrupted so that it is likely that one of the transmitted symbols 134 has also been corrupted, the retransmission controller 125 establishes a temporal correlation between the received corrupted symbol 135 and one or several transmitted symbols 134 to identify the symbols 134 and corresponding associated data stored in the buffer unit 122 that are to be retransmitted. In an embodiment, the retransmission controller 125 identifies the data buffered in buffer unit 122 that corresponds to one or several symbols 134 that have been transmitted within a given time-window before receiving the corrupted symbol 135. In an embodiment, the time-window is approximately the DSL symbol time. After establishing the temporal correlation, the retransmission controller 125 controls outputting of the data thus identified from the buffer unit 122 for retransmission.

While not shown in FIG. 7, the transceiver 120 may further comprise any additional suitable transmitter or receiver componentry. In an embodiment, the transceiver 120 comprises a framer and a RS coder coupled to the interleaver 121 to provide data thereto. In another embodiment, the transceiver 120 comprises a RS decoder and a deframer comprised by or coupled to the signal processor 133.

Different functional blocks of the transceiver 120 of FIG. 7 may be intercombined with one another. In an embodiment, the monitoring unit 132 is configured as a trellis decoder and is formed integrally with the demodulator 131. In another embodiment, the monitoring unit 132 and the retransmission controller 125 are integrally formed.

While in the transceiver 120 of FIG. 7 the data to be transmitted is buffered after interleaving, i.e., as frequency-domain symbols, and retransmission is implemented on the first layer of the OSI layer model, buffering of data for retransmission may also be taken care of at higher layers of the OSI layer model. Further, while in FIG. 7 the monitoring unit 132 is shown to monitor corruption of received data immediately after demodulation, it is to be understood that the detection of corruption could also be implemented at higher layers of the OSI layer model. In an embodiment, a measure of corruption of received data is determined after or upon de-interleaving and RS decoding.

Figure 8:
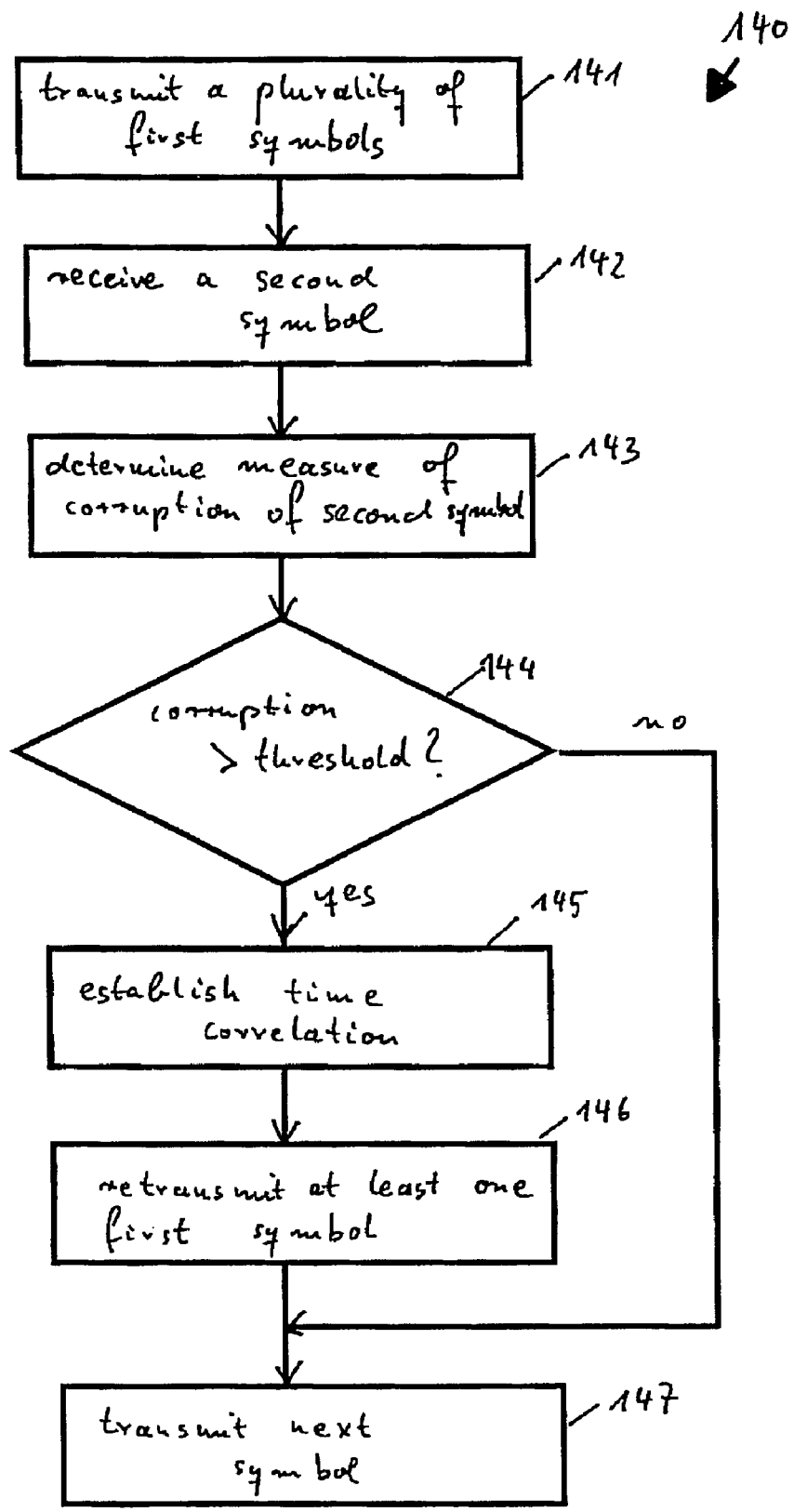
FIG. 8 is a flow diagram representation of a data transmission method according to another embodiment of the invention.

FIG. 8 is a schematic flow diagram representation of a method 140 according to an embodiment of the invention. The method 140 may be performed, e.g., by the transceiver 120 of the exemplary embodiment of FIG. 7. At step 141, a plurality of first symbols, such as OFDM or DMT symbols, are output from the transceiver for transmission to another transceiver. At step 142, a second symbol is received from the other transceiver. As used for the exemplary embodiment of FIG. 8, the term "first symbol" refers to a symbol that is transmitted, and the term "second symbol" refers to a symbol that is received at a transceiver. At step 143, a measure of corruption of the received symbol is determined and is compared to a threshold at step 144. Steps 143 and 144 may also be combined with one another, i.e., rather than separately determining a measure of corruption, it may be directly determined whether the corruption of the received symbol has reached or exceeds a given threshold. If the corruption of the received symbol is determined to be less than the threshold at step 144, the received symbol is further processed and a new symbol is transmitted at step 147. By contrast, if the corruption of the received symbol is determined to exceed the threshold at step 144, at step 145 a temporal correlation is established between the received symbol and at least one of the transmitted symbols in order to determine which of the transmitted symbols have been transmitted simultaneously with, or within a given time window of the transmission of, the received corrupted symbol. The thus determined symbol or the thus determined symbols are then retransmitted at step 146. Subsequently, the transmission and receiving of symbols continues until it is determined that another received symbol is corrupted.

Figure 9:
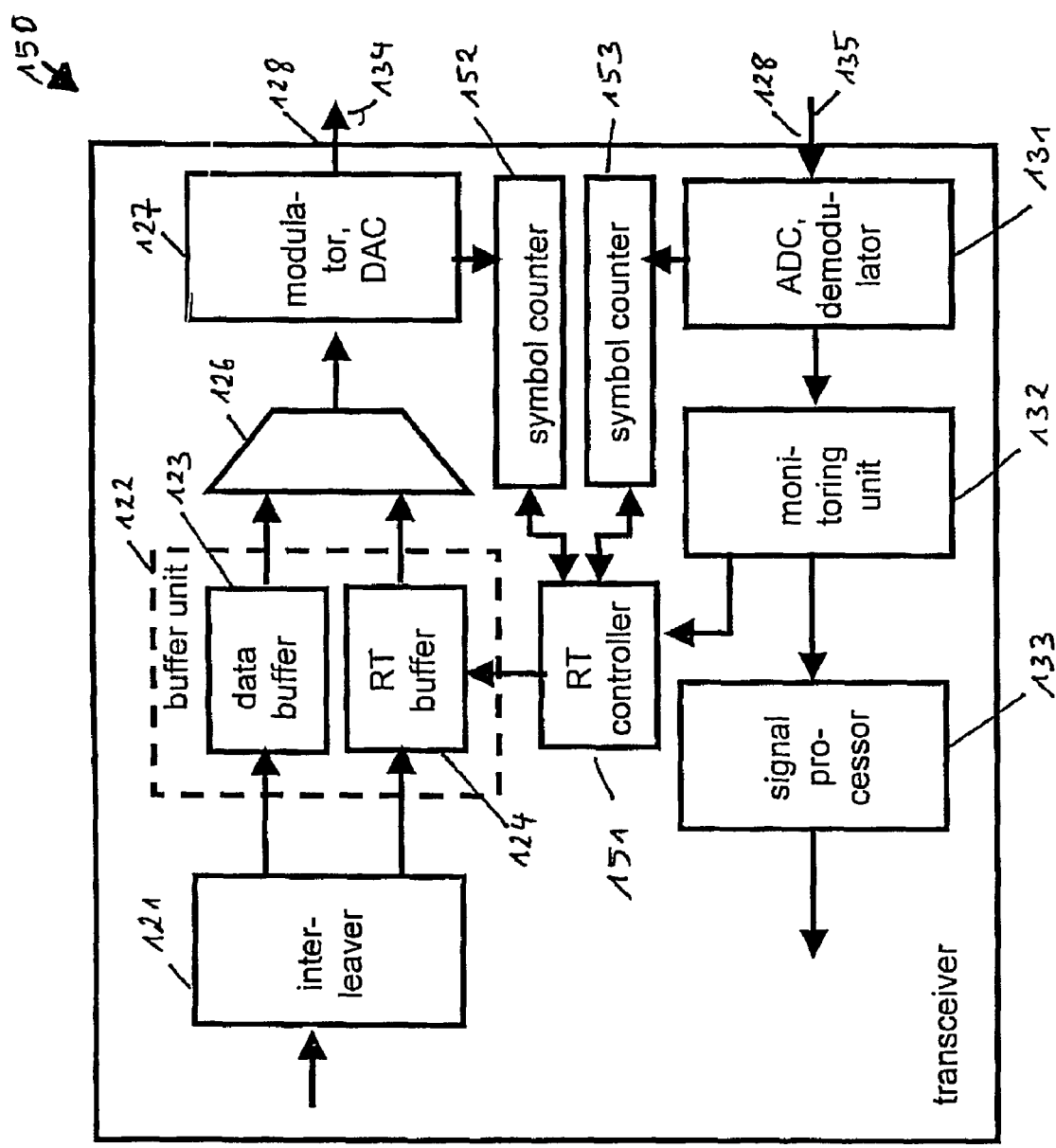
FIG. 9 is a schematic block diagram representation of a transceiver according to another embodiment of the invention.

FIG. 9 is a schematic block diagram representation of a transceiver 150 according to another embodiment of the invention. The transceiver 150 comprises an interleaver 121, a buffer unit 122 including a data buffer 123 and a retransmission buffer 124, a multiplexer 126, a modulator and D/A-converter 127, an interface 128, an A/D-converter and demodulator 131, a monitoring unit 132 and a signal processor 133, the configuration, operation and coupling of which are identical to the one of the corresponding components of transceiver 120 of the embodiment of FIG. 7. The transceiver 150 further comprises a retransmission controller 151 coupled to the monitoring unit 132 to receive a signal indicative of corruption of received symbols 135 therefrom, and to the retransmission buffer 124 to control outputting of interleaved buffered data therefrom to the multiplexer 126 for retransmission of a symbol. The transceiver 150 further comprises a first symbol counter 152 and a second symbol counter 153. The first symbol counter 152, the second symbol counter 153 and the retransmission controller 151 in combination establish a temporal correlation between received corrupted symbols 135 and transmitted symbols 134 that need to be retransmitted.

The first symbol counter 152 is coupled to the modulator and D/A-converter 127 and to the retransmission controller 151, and the second symbol counter 153 is coupled to the A/D-converter and demodulator 131 and to the retransmission controller 151. In an embodiment, the first symbol counter 152 counts symbols 134 output from the transceiver 150 via interface 128 to associate an identifier, such as a number, with each transmitted symbol 134, and the second symbol counter 153 similarly counts received symbols 135. In an embodiment, symbols are transmitted and received at identical rates, such as the DSL symbol time, and the respective count values are provided from the symbol counters 152, 153 to the retransmission controller 151 which determines a constant offset between the count of the transmitted symbol 134 and the count of the received symbol 135. When monitoring unit 132 and retransmission controller 151 determine that a received symbol 135 is corrupted or that it is corrupted to a certain degree and a retransmission of the symbol 134 is initiated, the retransmission controller 151 retrieves the number associated with the received corrupted symbol 135 from the second symbol counter 153 to determine the number or the numbers associated with the symbols 134 that are to be retransmitted. In an embodiment, the numbers of the symbols 134 that are to be retransmitted are determined based on the number associated with the received corrupted symbol 135 and the constant offset between the counter values. The retransmission controller 151 then controls the retransmission buffer 124 so that the respective data is output from the retransmission buffer 124 for retransmission.

In another embodiment, each symbol has an identifier associated with it that may be read from the symbol, and the symbol counters 152, 153 determine the symbol number by reading the identifier from the symbol to establish the temporal correlation to identify the data buffered in the retransmission buffer 124 and corresponding to the symbols 134 that are to be retransmitted.

Again, it is to be understood that the transceiver 150 of the embodiment of FIG. 9 may further comprise any other suitable transmitter or receiver componentry, such as a framer and de-framer, a RS coder and RS decoder, a trellis code modulator and a trellis decoder, and similar. Further, similarly to the embodiment of FIG. 7, in a variant of the embodiment of FIG. 9 monitoring the received symbols for corruption may be made at a later processing stage of the received symbols, e.g., after or upon trellis decoding and RS decoding.

Figure 10:
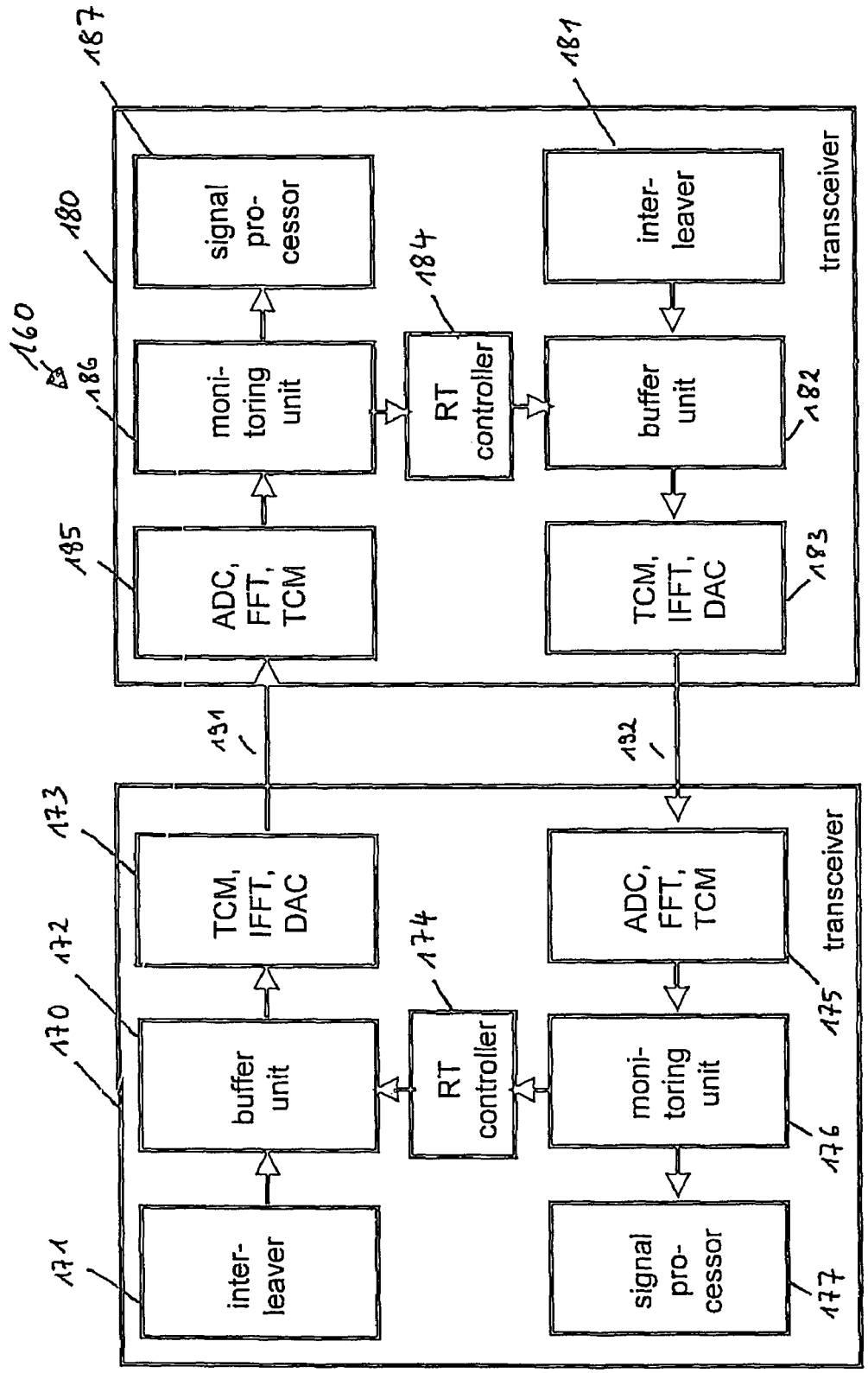
FIG. 10 is a schematic block diagram representation of a transmission system according to another embodiment of the invention.

FIG. 10 is a schematic block diagram representation of a transmission system 160 according to an embodiment of the invention, which comprises a first transceiver 170 and a second transceiver 180 that are coupled to one another via a data connection, such as a subscriber line or a wireless data connection. The first transceiver 170 comprises an interleaver 171, a buffer unit 172 coupled to the interleaver 171 to buffer interleaved data, and a modulator and D/A-converter 173 that, in the exemplary embodiment of FIG. 10, comprises a trellis code modulator, and performs an inverse Fourier transform (e.g., for DMT modulation). In the transmitter path, data output from the interleaver 171 is buffered by the buffer unit 172 and, after modulation by modulator 173, is output as symbol 191 from the transceiver. The transceiver 170 further comprises in a corresponding receiver path an A/D-converter and demodulator 175 that, in the exemplary embodiment of FIG. 10, comprises a trellis decoder and performs a Fourier transform, a monitoring unit 176 coupled to the modulator 175 and monitoring corruption of received symbols 192, and a signal processor 177 coupled to the monitoring unit 176 that performs data processing of the data comprised by the received symbols 192. The transceiver 170 further comprises a retransmission controller 174 coupled to the monitoring unit 176 and the buffer unit 172. The transceiver 180 comprises corresponding functional units 181-183, i.e., an interleaver 181, a buffer unit 182 and a modulator and D/A-converter 183 in a transmitter path, and functional units 185-187, namely an A/D-converter and demodulator 185, a monitoring unit 186 and a signal processor 187, in a receiver path, respectively, and a retransmission controller 184.

In operation, a stream of first symbols 191, for example OFDM symbols, is transmitted from the transceiver 170 to the transceiver 180, while a stream of second symbols 192 is transmitted from the transceiver 180 to the transceiver 170. For the transmission of first symbols 191, data is interleaved by the interleaver 170, the interleaved data is then buffered in the buffer unit 172 and modulated by the modulator 173 to generate the first symbols 191 that are then output from the transceiver 170 and transmitted to the transceiver 180, where the symbols are received and processed by the receiver path 185-187 of the transceiver 180. After transmitting the first symbol 191, the corresponding data remains buffered in the buffer unit 172 of the transceiver 170 for a predetermined short time period. Similarly, second symbols 192 are output from the second transceiver 180 and transmitted to the receiver path 175-177 of the first transceiver 170. After A/D-conversion and demodulation, the second symbols 192 received at the transceiver 170 are monitored by monitoring unit 176 to determine whether a measure of corruption of the second symbol 192 received by transceiver 170 exceeds a threshold and to provide a signal indicative of the measure of corruption of the second symbol to the retransmission controller 174. Based on the corruption of the received second symbol, the retransmission controller 174 then determines whether interleaved data buffered in the buffer unit 172 is to be retransmitted. In an embodiment, a temporal correlation is established between the corrupted second symbol 192 and a first symbol 191 to determine which of the buffered interleaved data has to be output from the buffer unit 172 to the modulator 173 for generating the first symbol 191 again for retransmission.

Similarly, in the second transceiver 180, the retransmission controller 184 controls outputting of data corresponding to a second symbol 192 and buffered in buffer unit 182 for retransmission based on a detected measure of corruption of the first symbol 191 received at the second transceiver 180.

It will be appreciated that, since both the first symbols 191 and the second symbols 192 transmitted between the transceiver 170, 180 correspond to a data flow, in the embodiment of FIG. 10 no dedicated transmission channel has to be provided for the transmission of control signals.

While the present invention has been described with reference to exemplary embodiments above, it is to be understood that many modifications and variations of these embodiments are conceivable within the scope of the invention as defined by the appended claims. For example, a transmitter and receiver or a pair of transceivers according to any one embodiment of the invention may be coupled to each other via a physical link, such as a subscriber line, or by a wireless data connection. In an embodiment, a transceiver according to an embodiment of the invention is installed in customer premises and another transceiver according to an embodiment of the invention is installed in a central office or local exchange or in an outdoor digital subscriber line access multiplexer (DSLAM).

Further, it is to be understood that any functional unit or block shown in the drawings and described above may comprise several functional sub-units that may be formed as separate entities. In an exemplary embodiment, a modulator may be comprised of a trellis code modulator and a separate OFDM modulator, that are formed separately from a D/A-converter. Similarly, it is to be understood that any functional block shown in the drawings and described above is shown as an entity only for the purpose of better explaining the principles of the invention, and that two or more of the functional blocks may formed as an integral unit. In an embodiment, the monitoring unit that determines a measure of corruption of a received symbol may be formed integrally with the signal demodulator or a component thereof. For example, the monitoring unit may be formed as a trellis decoder that both has a function of demodulating or decoding a received symbol and of determining a measure of corruption of the received symbol. In another embodiment, the monitoring unit may be formed integrally with a signal processing unit, such as a RS decoder.

Figure 11:
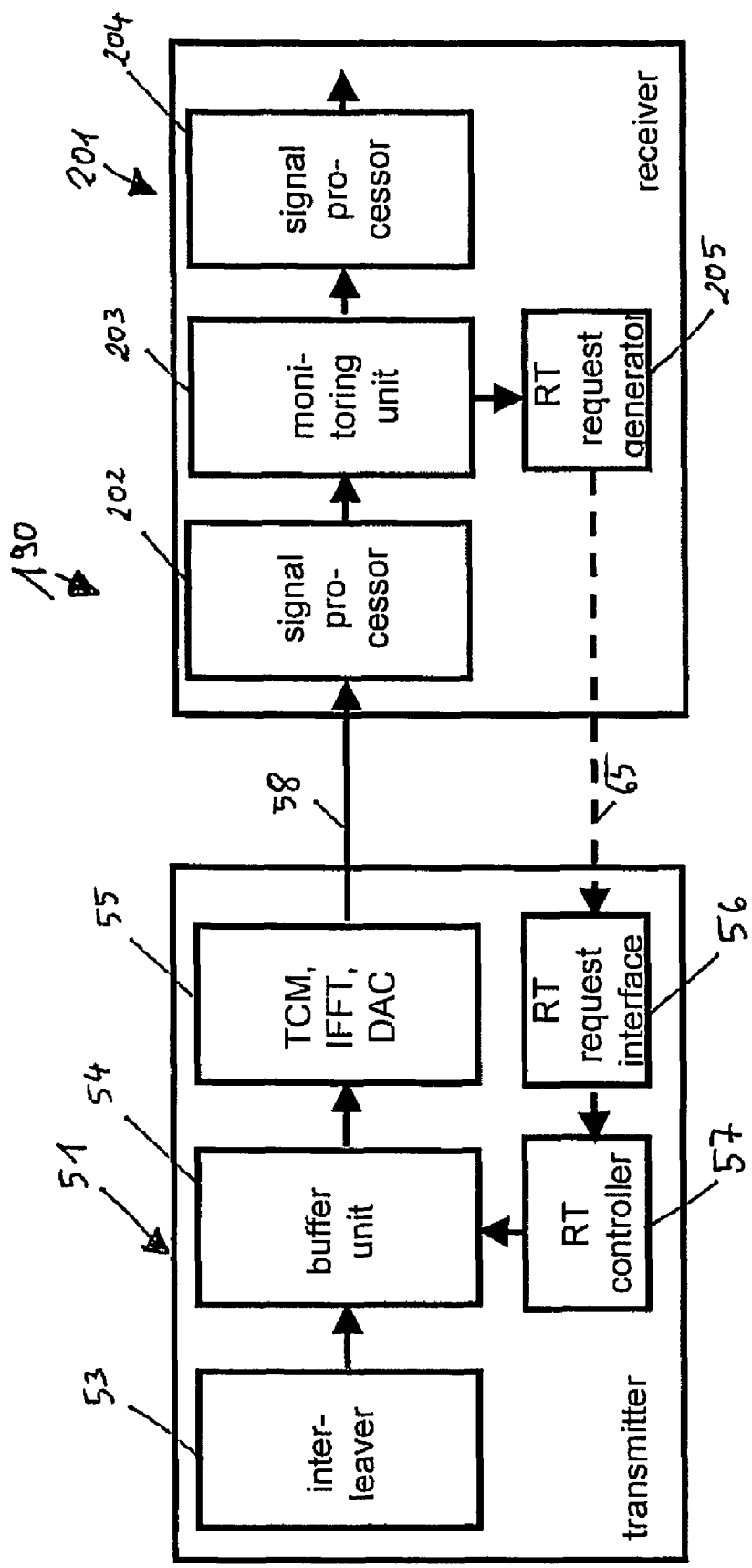
FIG. 11 is a schematic block diagram representation of a transmission system according to another embodiment of the invention.

While according to some of the exemplary embodiments explained above, a measure of corruption of a received symbol is determined after demodulation of the symbol and before any further signal processing, such as de-interleaving or RS-decoding, the measure of corruption may also be determined at any suitable other stage of a receiver path, e.g., by the RS decoder or by the trellis decoder. For example, FIG. 11 is a schematic block diagram representation of a transmission system 190 according to another embodiment of the invention which comprises a transmitter unit 51 having a configuration and operation that is identical to the one of the transmitter unit of the transmission system 50 of FIG. 4 and a receiver unit 201. The receiver unit 201 comprises a first signal processor 202 that performs various signal processing functions for a symbol transmitted from the transmitter unit 51 to the receiver unit 201, a monitoring unit 203 coupled to the first signal processor 202 to determine a corruption of the transmitted symbol, and a second signal processor 204 coupled to the monitoring unit 203 to perform further signal processing functions. Based on a corruption of the transmitted symbol determined by the monitoring unit 203, a retransmission request generator 205 coupled to the monitoring unit 203 generates a retransmission request that is transmitted to the transmitter. In the exemplary embodiment of FIG. 11, some signal processing is performed for the received symbol before the monitoring unit 203 monitors the corruption of the symbol.

Finally, any functional unit or component shown in the drawings and explained above may be implemented in hardware, in software or in a combination of both, it being understood that the all such embodiments are considered to be comprised by the present invention as it is defined in the appended claims.

What is claimed is:

1. A method of transmitting data, comprising:
   interleaving data to generate interleaved data,
   converting said interleaved data into a modulated signal,
   transmitting said modulated signal,
   storing said interleaved data,
   determining whether a retransmission of said modulated signal is required, said determining including receiving said modulated signal, said determining of whether a retransmission of said modulated signal is required being performed before a de-interleaving is performed on said received signal,
   selectively retransmitting said interleaved data based on a result of said determining, and
   forwarding the interleaved data to the de-interleaving operation only if the interleaved data is not retransmitted based on the result of the determining.

2. The method of claim 1, further comprising
   generating a retransmission request at a receiver receiving said modulated signal.

3. The method of claim 2, wherein said retransmission request comprises an identifier of said modulated signal.

4. The method of claim 1, wherein said retransmitting comprises retrieving said stored interleaved data and converting said stored interleaved data into said modulated signal.

5. The method of claim 1, wherein said converting comprises trellis coding.

6. The method of claim 1, wherein said converting comprises an orthogonal frequency division multiplexing modulation.

7. The method of claim 1, further comprising performing Reed-Solomon coding of said data prior to said interleaving.

8. The method of claim 1, wherein said storing comprises buffering said interleaved data.

9. A transmitter, comprising
   an interleaver to provide interleaved data,
   a modulator operably coupled to said interleaver to convert said interleaved data into a modulated signal,
   a buffer unit operably coupled to said interleaver to buffer said interleaved data and operably coupled to said modulator to provide said buffered interleaved data thereto, and
   a retransmission controller, said retransmission controller including an input to receive an indicator indicating whether said interleaved data is to be retransmitted, said indicator being generated after a transmission of said modulated signal and prior to de-interleaving said transmitted modulated signal, and an output operably coupled to said buffer unit to control outputting of said buffered interleaved data from said buffer unit to said modulator in dependence on said indicator.

10. The transmitter of claim 9, wherein said indicator is indicative of a corruption of said modulated signal during a transmission.

11. The transmitter of claim 9, wherein said modulator includes a discrete multitone modulator.

12. The transmitter of claim 9, wherein said modulated signal comprises an orthogonal frequency division multiplexing symbol.

13. The transmitter of claim 9, wherein said modulator includes a trellis code modulator.

14. The transmitter of claim 9, further comprising
   an analog interface operably coupled to said modulator, wherein said modulator transmits said modulated signal via said analog interface.

15. The transmitter of claim 14, further comprising
   a subscriber line operably coupled to said analog interface.

16. The transmitter of claim 9, further comprising
   a retransmission request interface coupled to said input of said retransmission controller, wherein said indicator comprises a retransmission request received at said retransmission request interface.

17. The transmitter of claim 16, wherein said retransmission request includes an identifier of said modulated signal.

18. The transmitter of claim 9, further comprising
   a Reed-Solomon coder coupled to provide Reed-Solomon coded data to said interleaver.

19. The transmitter of claim 9, wherein said modulator is coupled to said interleaver via said buffer unit and receives said interleaved data via said buffer unit.

20. An arrangement for use in a receiver, comprising:
a demodulator configured to generate a demodulated signal from a received orthogonal frequency division multiplexing symbol,
a de-interleaver coupled to said demodulator to de-interleave said demodulated signal,
a monitoring unit operably coupled to said demodulator to monitor corruption of said demodulated signal based on trellis decoding information or digital-to-analog conversion saturation obtained before said demodulated signal is input to said de-interleaver, said monitoring unit being further configured to determine based on said monitored corruption whether said demodulated signal is to be supplied to said de-interleaver, wherein the monitoring unit is configured to forward the demodulated signal to the de-interleaver only if the monitored corruption satisfies a predetermined criterion, and precludes the demodulated signal from being forwarded to the de-interleaver otherwise, and
a retransmission request generator coupled to said monitoring unit to generate a retransmission request based on said monitored corruption.

21. A data transmission system, comprising:
a transmitter comprising an interleaver to provide interleaved data, a storage unit coupled to said interleaver to store said interleaved data, an interface coupled to said storage unit to transmit a symbol generated based on said stored interleaved data, and a retransmission controller coupled to said storage unit,
a receiver comprising an interface to receive said symbol, a monitoring unit coupled to said interface and configured to monitor corruption of said symbol before said symbol is input to a de-interleaver, and a retransmission request generator coupled to said monitoring unit,
wherein said retransmission request generator is configured to generate a retransmission request and the monitoring unit does not forward the received symbols to the de-interleaver if said monitored corruption exceeds a pre-determined threshold, and wherein the monitoring unit does forward the received symbols to the de-interleaver if the monitored corruption does not exceed the pre-determined threshold, and
wherein said retransmission controller is configured to receive said retransmission request and to initiate outputting of said stored interleaved data from said storage unit to retransmit said interleaved data.

22. The transmission system of claim 21, wherein said symbol comprises an orthogonal frequency division multiplexing symbol.

23. The transmission system of claim 21, wherein said retransmission request comprises a symbol identifier identifying said symbol.

24. A receiver, comprising:
a monitoring unit configured to monitor corruption of a signal received at said receiver, said monitoring unit being configured to monitor said corruption at the first layer of the OSI layer model,
a signal processor operably coupled to said monitoring unit, and
a retransmission request generator operably coupled to said monitoring unit to generate a retransmission request,
said monitoring unit being configured to determine based on said monitored corruption whether a retransmission of said received signal is required and initiate the retransmission if the monitored corruption exceeds a pre-determined threshold, and output the received signal to said signal processor for further processing if the monitored corruption does not exceed the pre-determined threshold.

25. The receiver of claim 24, wherein said monitoring unit is configured to monitor corruption of a received demodulated signal based on trellis decoding information or digital-to-analog conversion saturation of said received signal.

26. The receiver of claim 24, wherein said received signal is an OFDM or DMT symbol.

* * * * *